US009794784B2

(12) United States Patent
Kollu et al.

(10) Patent No.: US 9,794,784 B2
(45) Date of Patent: Oct. 17, 2017

(54) TECHNIQUES FOR PREVENTING UNAUTHORIZED USERS FROM CONTROLLING MODEM OF MOBILE DEVICE

(71) Applicant: QUALCOMM Incorporated, San Diego, CA (US)

(72) Inventors: Tirumala Rama Rao Kollu, Telangana (IN); Uday Kumar Arava, Telangana (IN)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 14/609,316

(22) Filed: Jan. 29, 2015

(65) Prior Publication Data
US 2016/0227404 A1 Aug. 4, 2016

(51) Int. Cl.
H04W 12/06 (2009.01)
G06F 21/55 (2013.01)
H04L 29/06 (2006.01)
H04W 12/08 (2009.01)

(52) U.S. Cl.
CPC ......... H04W 12/06 (2013.01); G06F 21/55 (2013.01); H04L 63/08 (2013.01); H04L 63/10 (2013.01); H04L 63/105 (2013.01); H04L 63/14 (2013.01); H04W 12/08 (2013.01)

(58) Field of Classification Search
CPC ....... H04W 12/06; H04W 12/08; G06F 21/55; H04L 63/0428; H04L 63/08; H04L 63/105; H04L 63/14; H04L 63/10
See application file for complete search history.

(56) References Cited

U.S. PATENT DOCUMENTS 5,678,004 A * 10/1997 Thaweethai ............ H04L 29/06
713/155
6,286,105 B1 9/2001 Morley et al.
7,383,432 B1 * 6/2008 Barnes .................... G06F 21/55
713/151

(Continued)

OTHER PUBLICATIONS

U.S. Robotics. (n.d.). Courier 56K Business Modem Command Reference. Retrieved Sep. 26, 2014 from http://support.usr.com/support/3453b/3453b-crg/chap%209-accessing%20and%20configuring%20remotely.htm, 11 pgs.

(Continued)

Primary Examiner — Hosuk Song
Assistant Examiner — J. Brant Murphy
(74) Attorney, Agent, or Firm — Hunter Clark PLLC

(57) ABSTRACT

Techniques for protecting a configuration of a modem of a mobile device are provided. These techniques include a method that includes receiving a modem control command at a terminal interface of the modem and authenticating the modem control command by determining an authentication level currently associated with the modem, determining a command type associated with the modem control command, and executing an authentication procedure based on the authentication level associated with the modem and the command type associated with the modem control command. The method also includes executing the modem control command responsive to authentication being successful and preventing execution of the modem control command responsive to the authentication being unsuccessful.

32 Claims, 8 Drawing Sheets

(56) References Cited

U.S. PATENT DOCUMENTS

| | | |
|---|---|---|
| 8,537,762 B2 | 9/2013 | Babbar |
| 2005/0039005 A1* | 2/2005 | Dyck ............... H04L 63/08 713/168 |
| 2005/0048997 A1* | 3/2005 | Grobler ............ H04L 69/08 455/550.1 |
| 2005/0071129 A1* | 3/2005 | Yeap ............... G06F 21/335 702/188 |
| 2006/0280150 A1* | 12/2006 | Jha ............... G06F 9/44589 370/338 |
| 2008/0003981 A1* | 1/2008 | Sharma ............ H04L 63/08 455/411 |
| 2010/0035587 A1* | 2/2010 | Bennett ............ H04L 67/34 455/414.1 |
| 2011/0096726 A1* | 4/2011 | Schlack ........... H04W 72/0453 370/328 |
| 2011/0154032 A1 | 6/2011 | Mauro, II |
| 2012/0159218 A1* | 6/2012 | Vangala ........... G06F 9/5094 713/323 |
| 2012/0311176 A1* | 12/2012 | Dellinger ......... H04M 15/8055 709/232 |
| 2013/0067081 A1* | 3/2013 | Liu ............... H04W 12/06 709/225 |
| 2016/0112390 A1* | 4/2016 | Thorgrimsson ..... H04W 4/008 726/7 |

OTHER PUBLICATIONS

International Search Report and Written Opinion—PCT/US2016/014462—ISA/EPO—dated Apr. 6, 2016, 11 pgs.
Second Written Opinion from International Application No. PCT/US2016/014462 dated Dec. 15, 2016, 6 pgs.
International Preliminary Report on Patentability—PCT/US2016/014462—ISA/EPO—dated Mar. 6, 2016—18 pgs.

* cited by examiner

Mobile Device

Modem of Mobile Device

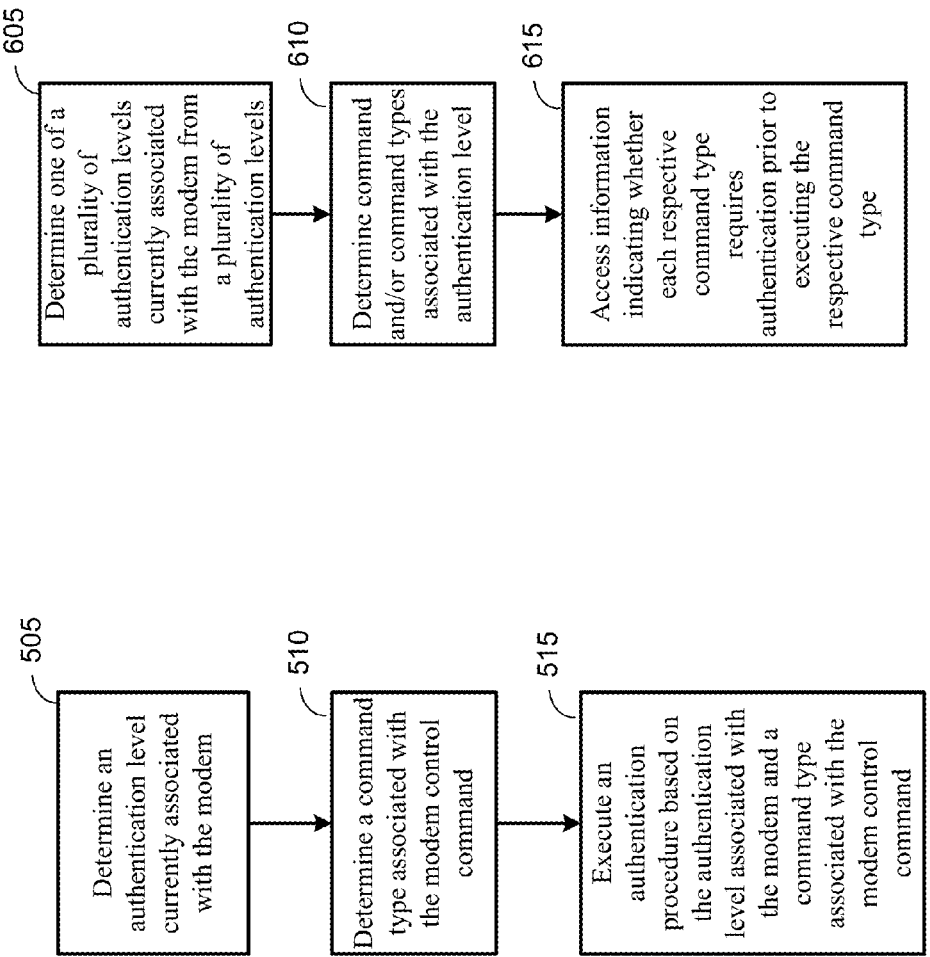

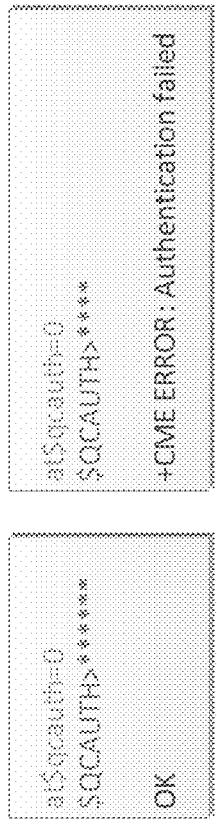
FIG. 7A
FIG. 7B
Example of Turning off Authentication
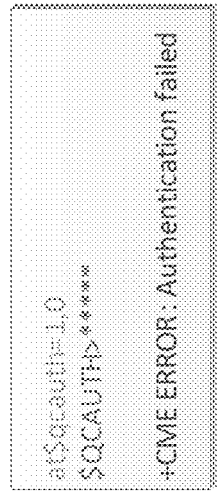
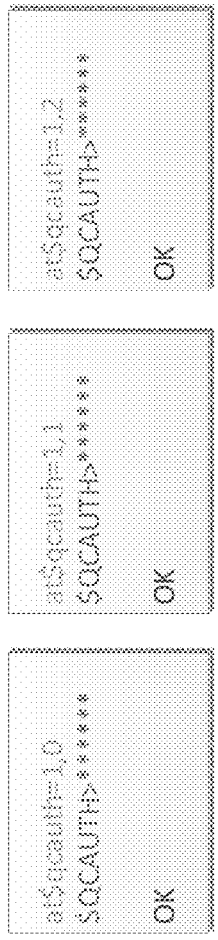
FIG. 8A
FIG. 8B
FIG. 8C
FIG. 8D
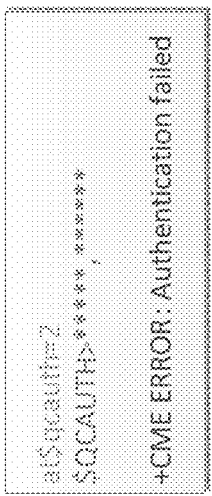
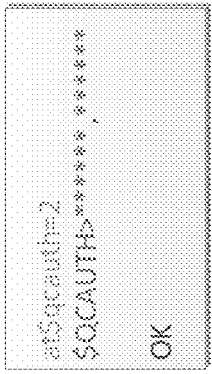
FIG. 9A
FIG. 9B

```
$QCAUTH>******
OK
at+cops?
+COPS: 0,2,"1111",2
OK
```

FIG. 10A

```
at+cops?
+COPS: 0,2,"1111",2
OK
atd123;
+CME ERROR: Authentication failed
AT+CSIM=14,"A0A40000026 F07"
+CME ERROR: Authentication failed
at$qcauth=3
$QCAUTH>******
OK
atd123;
OK
AT+CSIM=14,"A0A40000026 F07"
OK
```

FIG. 10B

```
at+cops?
+COPS: 0,2,"1111",2
OK
atd123;
OK
AT+CSIM=14,"A0A40000026 F07"
+CME ERROR: Authentication failed
at$qcauth=3
$QCAUTH>******
OK
AT+CSIM=14,"A0A40000026 F07"
OK
```

FIG. 10C

```
at+cops?
+COPS: 0,2,"11111",2

OK
atd123;
+CME ERROR: Authentication failed
AT+CSIM=14,"A0A40000026F07"
+CME ERROR: Authentication failed
at$qcauth=3
$QCAUTH>****
+CME ERROR: Authentication failed
atd123;
+CME ERROR: Authentication failed
AT+CSIM=14,"A0A40000026F07"
+CME ERROR: Authentication failed
```

FIG. 10D

```
at+cops?
+COPS: 0,2,"11111",2

OK
atd123;
OK
AT+CSIM=14,"A0A40000026F07"
+CME ERROR: Authentication failed
at$qcauth=3
$QCAUTH>****
+CME ERROR: Authentication failed
AT+CSIM=14,"A0A40000026F07"
+CME ERROR: Authentication failed
```

FIG. 10E

TECHNIQUES FOR PREVENTING UNAUTHORIZED USERS FROM CONTROLLING MODEM OF MOBILE DEVICE

BACKGROUND

AT commands are extensively used to control the modem of mobile phones and other mobile devices for various functions such as voice calls, data calls, SMS, SIM access, phone book maintenance, network services, supplementary services and modem configurations etc. Conventional modems today lack an efficient method to prevent unauthenticated users or applications for using AT commands and other types of modem control commands. Although the user interface (UI) of a mobile phone has a lock to prevent unauthenticated users, AT commands or other modem control commands can still be used when tethering is enabled. No conventional protection is provided to prevent AT commands or other modem control commands from being issued to the modem of a mobile phone connected to a computer system.

SUMMARY

An example method for protecting a configuration of a modem according to the disclosure includes receiving a modem control command at a terminal interface of the modem; authenticating the modem control command by determining an authentication level currently associated with the modem, determining a command type associated with the modem control command, and executing an authentication procedure based on the authentication level associated with the modem and the command type associated with the modem control command; executing the modem control command responsive to authentication being successful; and preventing execution of the modem control command responsive to the authentication being unsuccessful.

Implementations of such a method may include one or more of the following features. The modem control command comprises an AT command or other modem control command for interfacing with the modem. Determining the authentication level currently associated with the modem comprises determining the authentication level currently associated with the modem from a plurality of authentication levels, wherein each respective authentication level of the plurality of authentication levels is associated with one or more command types and an indication indicating whether the authentication is required prior to executing each respective command type. Executing the authentication procedure based on the authentication level associated with the modem and the command type associated with the modem control command further comprises determining whether the indication associated with the command type associated with the modem control command requires performing the authentication prior to executing the modem control command. The authentication level associated with the modem is selected from a mandatory authentication level, a read-only authentication level, and calls-plus-read-only authentication level. Requiring authentication credentials to be provided before executing all modem control commands responsive to the authentication level being set to the mandatory authentication level. Requiring authentication credentials to be provided before executing all modem control commands except those modem control commands that are a read-only or test type modem control command responsive to the authentication level being set to the read-only authentication level. Requiring authentication credentials to be provided before executing all modem control commands, except those that are a read-only or test type modem control command or a modem control command to place a call using the modem, responsive to the authentication level being set to the calls-plus-read-only authentication level. Executing the authentication procedure based on the authentication level associated with the modem and the command type associated with the modem control command includes requesting an authentication password be provided, and comparing the authentication password to a previously received authentication password stored in a protected, non-transitory memory of the modem.

A computing device according to the disclosure includes a modem configured to receive a modem control command at a terminal interface of the modem; authenticate the modem control command, the modem being configured to determine an authentication level currently associated with the modem, determine a command type associated with the modem control command, and execute an authentication procedure based on the authentication level associated with the modem and the command type associated with the modem control command; execute the modem control command responsive to authentication being successful; and prevent execution of the modem control command responsive to the authentication being unsuccessful.

Implementations of such a computing device may include one or more of the following features. The modem being configured to determine the authentication level currently associated with the modem is configured to determine the authentication level currently associated with the modem from a plurality of authentication levels, wherein each respective authentication level of the plurality of authentication levels is associated with one or more command types and an indication indicating whether the authentication is required prior to executing each respective command type. The modem being configured to execute the authentication procedure based on the authentication level associated with the modem and the command type associated with the modem control command is further configured to determine whether the indication associated with the command type associated with the modem control command requires the authentication be performed prior to executing the modem control command. The authentication level associated with the modem is selected from a mandatory authentication level, a read-only authentication level, and calls-plus-read-only authentication level. The modem is configured to require authentication credentials to be provided before executing all modem control commands responsive to the authentication level being set to the mandatory authentication level. The modem is configured to require authentication credentials to be provided before executing all modem control commands except those modem control commands that are a read-only or test type modem control command responsive to the authentication level being set to the read-only authentication level. The modem is configured to require authentication credentials to be provided before executing all modem control commands, except those that are a read-only or test type modem control command or a modem control command to place a call using the modem, responsive to the authentication level being set to the calls-plus-read-only authentication level.

A non-transitory, computer-readable medium, having stored thereon computer-readable instructions for protecting a configuration of a modem of a mobile device, according to the disclosure includes instructions configured to cause a computer to receive a modem control command at a terminal interface of the modem; authenticate the modem control command, the instructions to authentication the modem control command comprise instructions to determine an authentication level currently associated with the modem, determine a command type associated with the modem control command, and execute an authentication procedure based on the authentication level associated with the modem and the command type associated with the modem control command; execute the modem control command responsive to authentication being successful; and prevent execution of the modem control command responsive to the authentication being unsuccessful.

Implementations of such a non-transitory, computer-readable medium may include one or more of the following features. The instructions configured to cause the computer to determine the authentication level currently associated with the modem include instructions configured to cause the computer to determine the authentication level currently associated with the modem from a plurality of authentication levels, wherein each respective authentication level of the plurality of authentication levels is associated with one or more command types and an indication indicating whether the authentication is required prior to executing each respective command type. The instructions configured to cause the computer to execute the authentication procedure based on the authentication level associated with the modem and the command type associated with the modem control command include instructions configured to cause the computer to determine whether the indication associated with the command type associated with the modem control command requires the authentication be performed prior to executing the modem control command. The authentication level associated with the modem is selected from a mandatory authentication level, a read-only authentication level, and calls-plus-read-only authentication level. The instructions configured to cause the computer to authenticate the modem control command include instructions configured to cause the computer to require authentication credentials to be provided before executing all modem control commands responsive to the authentication level being set to the mandatory authentication level. The instructions configured to cause the computer to authenticate the modem control command include instructions configured to cause the computer to require authentication credentials to be provided before executing all modem control commands except those modem control commands that are a read-only or test type modem control command responsive to the authentication level being set to the read-only authentication level. The instructions configured to cause the computer to authenticate the modem control command include instructions configured to cause the computer to require authentication credentials to be provided before executing all modem control commands, except those that are a read-only or test type modem control command or a modem control command to place a call using the modem, responsive to the authentication level being set to the calls-plus-read-only authentication level.

An apparatus according to the disclosure includes means for receiving a modem control command at a terminal interface of the modem; means for authenticating the modem control command including means for determining an authentication level currently associated with the modem, means for determining a command type associated with the modem control command, and means for executing an authentication procedure based on the authentication level associated with the modem and the command type associated with the modem control command; means for executing the modem control command responsive to authentication being successful; and means for preventing execution of the modem control command responsive to the authentication being unsuccessful. Examples of such an apparatus can include a modem, a processor, or other device. The apparatus can also comprise a computing device, such as smartphone, laptop, tablet computer, or other type of computing device.

Implementations of such an apparatus may include one or more of the following features. The means for determining the authentication level currently associated with the modem includes means for determining the authentication level currently associated with the modem from a plurality of authentication levels, wherein each respective authentication level of the plurality of authentication levels is associated with one or more command types and an indication indicating whether the authentication is required prior to executing each respective command type. The means for executing the authentication procedure based on the authentication level associated with the modem and the command type associated with the modem control command includes means for determining whether the indication associated with the command type associated with the modem control command requires the authentication be performed prior to executing the modem control command. The authentication level associated with the modem is selected from a mandatory authentication level, a read-only authentication level, and calls-plus-read-only authentication level. The means for authenticating includes means for requiring authentication credentials to be provided before executing all modem control commands responsive to the authentication level being set to the mandatory authentication level. The means for authenticating includes means for requiring authentication credentials to be provided before executing all modem control commands except those modem control commands that are a read-only or test type modem control command responsive to the authentication level being set to the read-only authentication level. The means for authenticating includes comprises means for requiring authentication credentials to be provided before executing all modem control commands, except those that are a read-only or test type modem control command or a modem control command to place a call using the modem, responsive to the authentication level being set to the calls-plus-read-only authentication level.

BRIEF DESCRIPTION OF THE DRAWINGS

FIG. 5 is a flow diagram of a process for authenticating a modem control command according to the techniques discussed herein.

FIG. 6 is a flow diagram of a process for determining an authentication level currently associated with a modem according to the techniques discussed herein.

FIGS. 7A, 7B, 8A, 8B, 8C, 8D, 9A, 9B, 10A, 10B, 10C, 10D, and 10E illustrate examples of a user interacting with the modem via a terminal interface to demonstrate the technique discussed herein.

DETAILED DESCRIPTION

Figure 1:
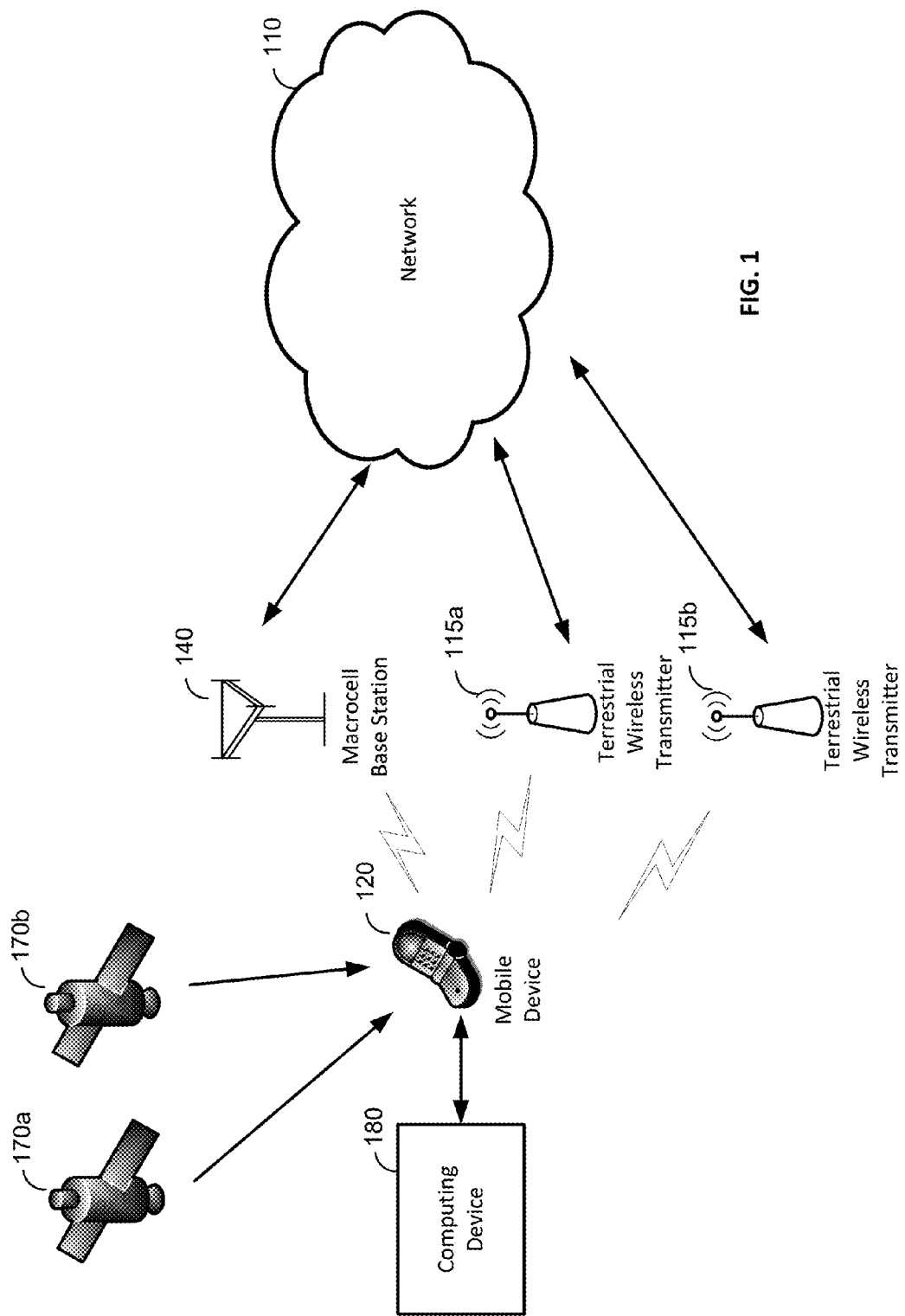
FIG. 1 is a block diagram of an example network architecture, which may be suitable for an implementing the techniques discussed herein.

Techniques are disclosed herein for preventing unauthenticated users or applications from using modem control commands on the modem of a wireless mobile device. The techniques disclosed herein can be applied to AT commands or other types of modem control commands. AT commands can be implemented in modems compliant with various standards for wireless communication, including, but not limited to, those promulgated by the 3$^{rd}$ Generation Partnership Project (3GPP) and the 3$^{rd}$ Generation Partnership Project 2 (3GPP2) wireless communication standards. These standards include the CDMA2000 and the Long-Term Evolution (LTE) wireless communication standards. The techniques disclosed herein are not limited to AT commands and can be applied to modems that use other types of modem control commands for changing modem configuration parameters, placing calls with the modem, and/or other usages of the modem that could damage the modem or the mobile device and/or allow unauthorized usage of the network connectivity of the mobile device. The techniques used herein can be used to authenticate AT commands or other types of modem control commands entered via a user interface of the mobile device and/or received from another device tethered to the mobile device. The mobile device can be configured to allow another device to access the modem of the mobile device in order to make use of the wireless networking capability of the mobile device.

The techniques discussed herein can be used to implement multiple levels of authentication in the modem of a mobile device. An authorized user of the mobile device can enable, disable, and/or configure the authentication level applied by the modem of the mobile device when an AT command or other type of modem control command is issued to the modem. The authorized user of the mobile device can select from one of a plurality of authentication levels that can be associated with the modem. Each authentication level can be associated with one or more command types and an authentication indication associated with each respective command type indicating whether authentication is required for that command type while the modem is configured to operate using that authentication level. An authentication level can also be associated with one or more specific AT commands or other type of modem control commands and an authentication indication can be associated with each respective command indicating whether authentication is required for that command type while the modem is configured to operate using that authentication level.

In response to receiving modem control command (which may be an AT command or other type of modem control command), the modem can authenticate the received command according to the authentication level under which the modem is currently configured to utilize. For example, the modem can determine a command type associated with the modem control command received and to determine an authentication procedure for the modem control command based on the modem control command and/or the command type of the modem control command and the current authentication level. The modem can be configured execute the modem control command in response to the authentication procedure being successful and to prevent execution of the modem control command in response to the authentication procedure being unsuccessful. In some implementations, the modem can provide an interface that allows an authorized user to select an authentication level under which the modem should operate. The modem can also include an interface for selecting more than one authentication level under which the modem should operate. For example, a first authentication level can be applied to modem control commands received from a tethered device, which a second authentication level is applied to modem control commands received from the mobile device in which the modem is installed. In some implementations, the modem can also be configured to allow the authorized user to modify existing authentication level definitions and/or to create new authentication level definitions that can be used to protect the modem from unauthorized access.

The authentication level associated with the modem of the mobile device can be configured through the use of AT commands or other modem control commands, which may be communicated to the modem through a terminal program which provides an interface for communicating such commands to the modem.

Example Network Environment

FIG. 1 is a block diagram of an example network architecture, which may be suitable for an implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity.

The mobile device 120 may also be referred to as a User Equipment (UE), a mobile station, a terminal, an access terminal, a subscriber unit, a station, etc. The mobile device 120 may be a smartphone, a tablet computer, a laptop computer, or other device that includes a wireless transmitter that is configured to communicate using one or more wireless communications protocols, including, but not limited to, the Long Term Evolution (LTE), WiFi, and WiMAX wireless communications protocols. The mobile device 120 can also be configured to support other types of wireless communications protocols and can be configured to support multiple different wireless communications protocols. The wireless transmitter of the mobile device 120 can be configured to send data to and/or receive data from other mobile devices 120, the wireless transmitters 115, and/or one or more wireless base stations 140.

The mobile device 120 can include a modem configured to allow the mobile device 120 to connect to one or more wireless networks, such as the network 110. For example, the modem of the mobile device 120 can be configured to enable the mobile device 120 to wirelessly communicate with the wireless transmitters 115 and the wireless base station 140 to connect to the network 110. The modem of the mobile device 120 can also be configured to allow the mobile device 120 communicate with other mobile devices 120 (not shown). The modem of the mobile device 120 can be configured to support communications in more than one wireless communication protocol. The modem of the mobile device can be configured to provide means for implementing the techniques disclosed herein for preventing unauthorized users and/or applications from executing modem control commands that could make unauthorized use of the network connectivity provided by the modem of the mobile device 120. The technique disclosed herein can also prevent unauthorized users from executing unauthorized modem control commands that could alter the configuration of the modem, which could results in the undesirable behavior and/or the malfunctioning of the modem which could cause the mobile device 120 to be unable to utilize wireless network connectivity.

The computing device 180 comprises a device that can optionally be tethered to the mobile device 120 to allow the computing device 180 to share the wireless network connectivity of the mobile device 120. The computing device 180 may be tethered to mobile device 120 via a wired and/or a wireless connection. For example, the computing device 180 can be tethered to the mobile device 120 via a Universal Serial Bus (USB) connection or via a wireless LAN (Wi-Fi) or Bluetooth connection. Other types of wireless or wired connections can be used to connect the computing device 180 to the mobile device 120.

While tethered to the mobile device 120, the computing device 180 can be configured to submit AT commands and/or other types of modem control commands to the modem of the mobile device 120. Some commands may be read-only commands that request information from the modem, but other modem control commands may cause the modem to initiate calls and/or alter the configuration of the modem. The ability to initiate a call utilizing the modem of the mobile device 120 can be used to connect the mobile device 120 to a wireless network provider and allow the tethered computing device 180 to utilize voice and/or data services of the mobile communication network via the mobile device 120. This can result in undesired usage of a voice and/or data plan associated with the mobile device 120. Furthermore, modem control commands that alter the configuration of the modem of the mobile device. For example, an unauthenticated user of the computing device 180 could potentially change the PIN of the SIM card and lock out the user of the mobile device 120 from accessing information on the SIM card and from utilizing the SIM card. Furthermore, if the SIM card is locked using a Personal Unblocking Code/PIN Unlock Key (PUK) and the unauthorized user of the computing device 180 enters an incorrect PUK more than a predetermined number of times, the SIM card can be permanently blocked resulting in the user of the mobile device 120 having to obtain a new SIM card in order to continue utilizing the wireless networking capabilities of the mobile device 120. A user of the computing device 180 can also attempt to execute modem control commands that can result in carrier specific configuration information stored in the SIM card, in the non-volatile storage of the modem, and/or EFS data being corrupted, which can render the modem unusable. The EFS data can include information such as the International Mobile Station Equipment Identity (IMEI) number used to identify the mobile device 120 and a Media Access Control (MAC) address of the mobile device 120.

A user of the computing device 180 could also execute other commands that alter other important data stored on the SIM card. For example, the +CSIM and +CRSM AT commands can be used to access SIM database and unauthenticated usage of these AT commands can corrupt SIM data, the +CSCA AT command can be used to read/write SMS templates in either SIM or Modem static storage (NV) and unauthenticated usage of this AT command can corrupt the SMS templates, and the +CNMI AT command is used to read/write SMS route configurations and unauthenticated usage of this AT command can corrupt SMS route configurations. Conventional approaches to securing the mobile device, such as a device PIN or SIM PIN do not prevent a user of a tethered device, such as the computing device 180, from accessing sensitive data on the SIM card and/or the modem and from altering or corrupting such data. The techniques disclosed herein provide a multi-level authentication technique that can be used to prevent such unauthorized use of the modem and/or the SIM card of the mobile device.

The mobile device 120 can also be configured to measure signals from one or more wireless base stations or wireless access points, such as the wireless transmitters 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the mobile device 120. A location estimate may also be referred to as a position estimate, a position fix, etc. Two terrestrial wireless transmitters are illustrated in this example: 115a and 115b. However, in other implementations, more or less wireless transmitters 115 may be included. The mobile device 120 can also be configured to use a combination of signals from one or more of the satellites 170, the wireless base station 140, and/or the wireless transmitters 115 to determine a position of the mobile device 120.

Each of the wireless transmitters 115 can comprise a WLAN wireless access point configured to operate using the IEEE 802.11 wireless communication standards. But, in some implementations some or all of the wireless transmitters 115 may be configured to utilize other wireless communications protocols, and some network environments may include a more than one type of wireless transmitter 115. Furthermore, while the wireless transmitters 115 are identified as transmitters, the wireless transmitters 115 may be transceivers configured to send and/or receive data wirelessly. The wireless transmitters 115 can be connected to network 110 via a backhaul connection that provides a broadband connection to the network 110. The network 110 may be the Internet and/or a combination of one or more networks. For example, the wireless transmitter 115 may be connected to a DSL modem or a cable modem, depending upon the type of broadband service being used in that particular implementation. A wireless transmitter 115 can be associated with a mobile communication network provider and can be configured to communicate with the mobile communication network provider's network (not shown) via the network 110. The coverage area of the a wireless transmitter 115 may overlap with that of one or more macrocell base stations, such as wireless base station 140, or that of one or more other terrestrial transceivers.

The wireless base station 140 can be configured to provide wireless network connectivity to a plurality of mobile devices 120. The wireless base station 140 may comprise a macrocell base station or other type of base station. The wireless base station 140 may have a much larger coverage area than the wireless transmitters 115 or may be a terrestrial transceiver that provides a coverage area that is of a similar size or of a smaller size than the coverage area provided by the wireless transmitter 115. Wireless base station 140 can be configured to communicate using one or more wireless communications protocols. While the example illustrated in FIG. 1 includes on a single wireless base station 140, in other implementations the network environment is likely to include more than wireless base station 140 which have coverage areas that may overlap at least in part.

The mobile device 120 can be configured to include a Global Navigation Satellite System (GNSS) receiver configured to receive and measure signals from one or more satellites 170, such as satellites 170*a* and 170*b*, and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170*a* could belong to the GPS system while the satellite 170*b* could belong to the Galileo system. While the example network architecture illustrated herein illustrates only two satellites 170, other implementations may have more or less satellites available, may have satellites associated with one or more GNSS system, and the number of satellites visible to the mobile device 120 may depend upon the current geographical location of the mobile devices and the orbits of the satellites 170.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1.

Example Hardware

Figure 2:
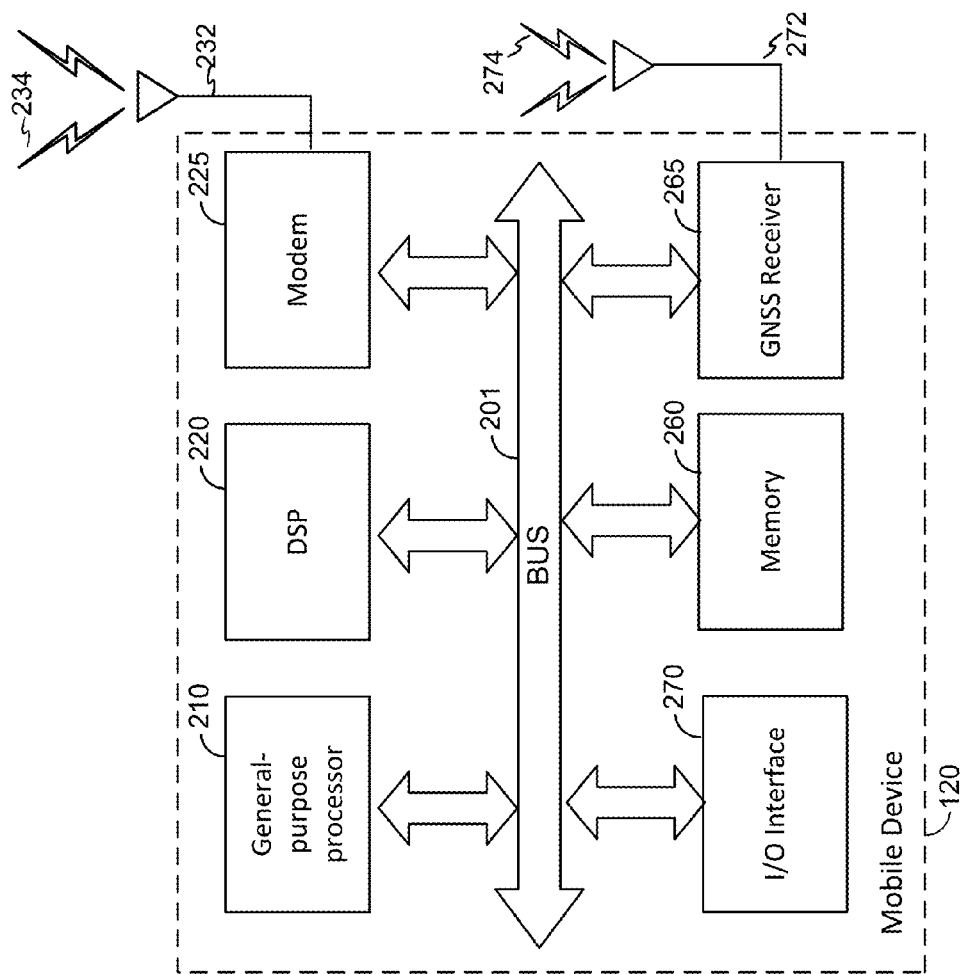
FIG. 2 is a block diagram of a mobile device that can be used to implement the mobile device illustrated in FIG. 1.

FIG. 2 is a block diagram of a mobile device that can be used to implement the mobile device 120 illustrated in FIG. 1. The mobile device 120 can be used to implement, at least in part, the processes illustrated in FIG. 4-6.

The mobile device 120 comprises a computer system including a general-purpose processor 210, a digital signal processor (DSP) 220, a modem 225, a GNSS interface 265, and a non-transitory memory 260, connected to each other by a bus 201. Other implementations of the mobile device 120 may include additional elements not illustrated in the example implementation of FIG. 2 and/or may not include all of the elements illustrated in the example embodiment illustrated in FIG. 2. For example, some implementations of the mobile device 120 may not include the GNSS interface 265.

The modem 225 can include a wireless receiver, transmitter, transceiver, and/or other elements that enable the mobile device 120 to send and/or receive data using WWAN, WLAN, and/or other wireless communication protocols. The modem 225 can comprise one or more multi-mode modems capable of transmitting and receiving wireless signals using multiple wireless communications standards. The modem 225 is connected by a line 232 to an antenna 234 for sending and receiving communications to/from the wireless transmitters 115, the wireless base station 140, and/or other wireless devices configured to communicate using wireless communication protocols. While the mobile device 120 illustrated in FIG. 2 comprises a single modem 225 and a single antenna 234, other implementations of the mobile device 120 can include multiple modems 225 and/or multiple antennas 234.

I/O interface 270 can provide one or more ports and/or other interfaces that can provide for data inputs and/or outputs to the mobile device 120. For example, the I/O interface 270 can include one or more ports, such as a Universal Serial Bus (USB) port and/or other type of port that can be used to connect external devices to the mobile device. For example, the computing device 180 can be tethered to the mobile device 120 using a wired connection to such a port. The I/O interface 270 can also include one or more input devices, such as buttons, switches, a keypad, a touchscreen and/or other means for receiving input from a user. The I/O interface 270 can also include one or more means for outputting audio and/or visual content, such as a screen, a speaker, a headphone port and/or other means for outputting such content.

The GNSS interface 265 can include a wireless receiver and/or other elements that enable the mobile device 120 to receive signals from transmitters associated with one or more GNSS systems. The GNSS interface 265 is connected by a line 272 to an antenna 274 for receiving signals from the GNSS transmitters, such as the satellites 170 illustrated in FIG. 1. The mobile device 120 can be configured to use signals received from satellites associated with satellites and other transmitters associated with the GNSS systems to determine a position of the mobile device 120. The mobile device 120 can also be configured to use the signals received from the satellites and other transmitters associated with the GNSS systems in conjunction with signals received from wireless transmitters 115 and/or wireless base stations 140 to determine a position of the mobile device 120.

The DSP 220 can be configured to process signals received from the modem 225 and/or the GNSS interface 265 and may be configured to process signals for or in conjunction with one or more modules implemented as processor-readable, processor-executable software code stored in memory 260 and/or can be configured process signals in conjunction with the processor 210.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 140, other mobile devices 120, and/or other devices configured for wireless communication.

Figure 3:
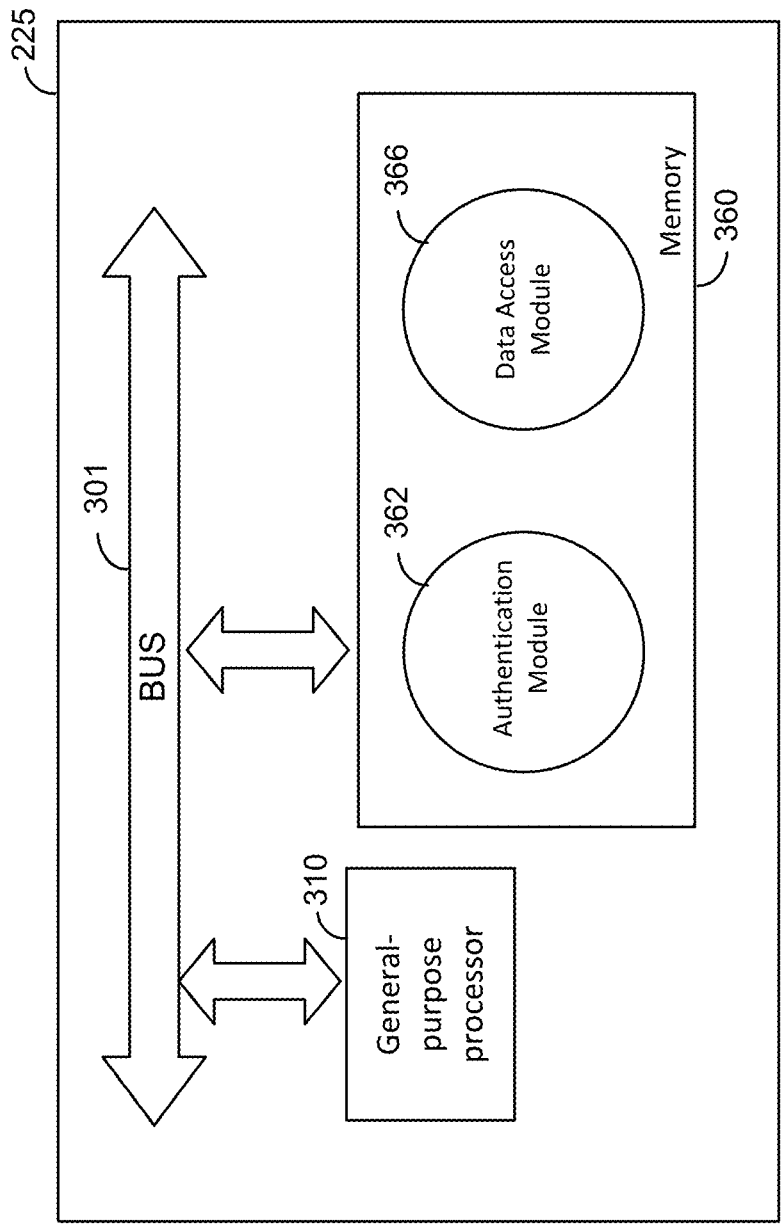
FIG. 3 is a functional block diagram of the modem of the mobile device illustrated in FIG. 2 that illustrates functional modules of the modem shown in FIG. 2.

FIG. 3 is a functional block diagram of an example implementation the modem 225 of the mobile device 120 illustrated in FIG. 2 that illustrates functional modules of the modem 225. The modem 225 comprises a general-purpose processor 310 and a non-transitory memory 360 connected to each other by a bus 301. The example implementation of the modem 225 illustrates a simplified version of the modem that highlights elements of the modem that are discussed with respect to the various techniques illustrated herein. Implementations of such a modem may include additional and/or alternative components not illustrated herein.

The memory 360 is a non-transitory storage device that can include random access memory (RAM), read-only memory (ROM), or a combination thereof. The memory 360 can store processor-readable, processor-executable software code containing instructions for controlling the processor 310 to perform functions described herein (although the description may read that the software performs the function(s)). The software can be loaded onto the memory 360 by being downloaded via a network connection, uploaded from a disk, etc. Further, the software may not be directly executable, e.g., requiring compiling before execution. The contents of the memory 360 may be protected such that the contents of the memory 360 may not be readable and/or modifiable by an external system, such as the mobile device 120. Furthermore, the modem 225 may be configured such that modem can connect to a remote server via a wireless connection through one or more intermediary networks to download updates to the software stored in the memory 360. The modem 225 can be configured to store modem configuration information in the memory 360, such that the modem configuration information persists between power cycles of the modem, and the modem 225 can be configured such that the modem configuration information and/or other such information stored in the memory may not be updated without first authenticating the user attempting to update the information stored in the memory 360.

The modem may include one or more functional modules, such as the authentication module 362 and a data access module 366 illustrated in FIG. 2. In the example illustrated in FIG. 2, these functional modules are illustrated as processor-executable software instructions that are stored in the memory 360 and may be executed by the processor 310 of the modem 225. However, the functional modules may be implemented in hardware or a combination of hardware and software. The authentication module can provide means for performing the various authentication techniques discussed herein unless otherwise specified, as hardware and/or software executable by the processor 310.

Figure 4:
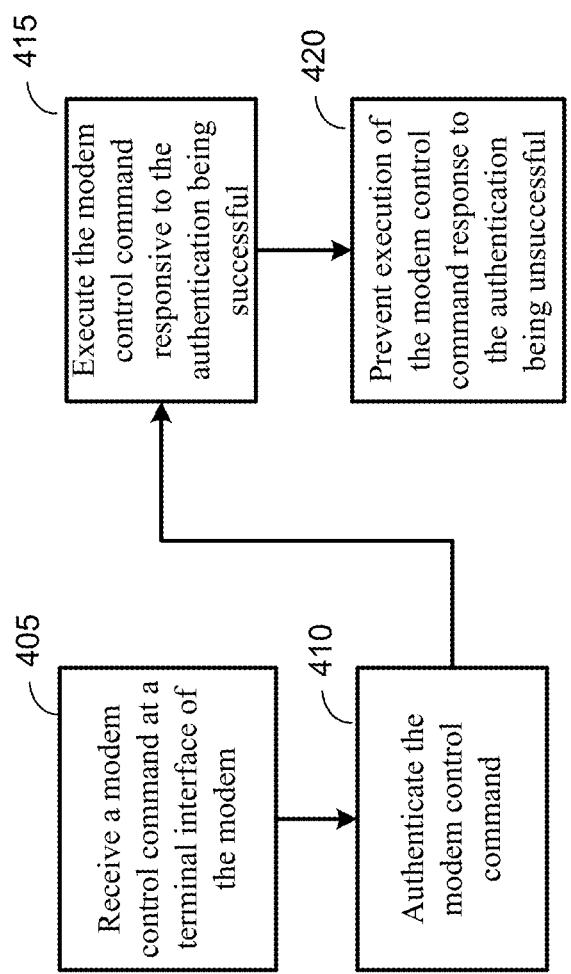
FIG. 4 is a flow diagram of a process for protecting the configuration of a modem according to the techniques discussed herein.

The authentication module 362 provides means for performing the various processes illustrated in FIGS. 4-6 unless otherwise noted. The authentication module 362 can be configured to provide for multiple authentication levels that can be used to prevent unauthorized usage of the networking features of the modem 225 and/or unauthorized changes to the configuration of the modem 225 which could result in the modem being rendered inoperable.

The data access module 366 can be configured to store data in the memory 360. The data access module 366 can also be configured to access data in the memory 360. The data access module 366 can be configured to receive requests from other modules and/or components of the modem 225, such as the authentication module 362, and to store and/or access data stored in the memory 360. For example, the authentication module 362 can be configured to store authentication information in the memory 360 and to access authentication information from the memory 360 via the data access module 366.

FIGS. 7A-10E illustrate example interactions with one example implementation of the modem 225. The examples of FIGS. 7A-10E illustrate one possible implementation of the modem 225 in which the modem 225 is configured to use AT commands and in which a user interacts with the modem 225 via a terminal program. The examples illustrated can represent the interactions of a user with the modem 225 via a terminal program from the mobile device 120 or from a tethered computing device 180. The specific AT commands, prompts, and responses from the modem 225 are merely examples of the techniques disclosed herein, and other implementations may utilize different commands, prompts, and responses from the modem 225.

The following example implementation of the modem 225 that illustrates the techniques disclosed herein is configured to include an AT command "$QCAUTH" that that can be used to enable, disable, and configure the authentication. While the example discussed herein utilizes an AT command to illustrate the concepts discussed herein, other implementation can be implemented in modems that utilize other types of modem control commands, and a command can be added to the set of commands available to a modem implementing another such set of modem control commands that performs similar functions to those described with respect to the $QCAUTH command. The $QCAUTH command can be used to configure the authentication parameters via a terminal program or application from the mobile device 120 and/or from a device tethered to the mobile device 120, such as the computing device 180.

The modem 225 can be configured such that the $QCAUTH command accepts two parameters: an authentication control parameter, and an authentication level parameter. The authentication control parameter can be used to enable authentication, disable authentication, change the authentication password or other authentication credentials, and/or authenticate the authentication password or other authentication credentials. In an example implementation, the authentication control parameters can be associated with the following numeric values: 0=Disable Authentication; 1=Enable Authentication; 2=Change Authentication Password/Credentials; 3=Authenticate Password/Credentials. The numeric value representations of the authentication control parameters utilized this example are merely provided to illustrate the concepts discussed herein and are not intended to limit the authentication control parameters to these numeric values. The authentication control parameters can be represented by other numeric and/or alphanumeric values that can be entered as part of a command issued to the modem 225. The Disable Authentication option can be used to disable authentication by the modem 225 such that any modem control command can be issued without requiring the issuer of the commands to be authenticated. The Enable Authentication option can be used to enable authentication by the modem 225. The modem 225 can be configured to prompt for an authentication password or other authentication credentials from the issuer of the command to enable or disable authentication to ensure that the issuer of the command is authorized to make such changes. The Change Authentication Password/Credentials option can be used to change the information used to identify a user of the modem 225 who is authorized to enable or disable authentication and/or change the authentication level under which the modem 225 is currently operating. The modem 225 can be configured to prompt for an authentication password or other authentication credentials from the issuer of the command prior to updating the authentication password/credentials used to ensure that the issuer of a modem control command is authorized to perform such actions. The Authenticate Password/Credentials option can be used to authenticate a user prior to the user entering a command that requires authentication under the authentication level under which the modem 225 is currently configured to operate. The modem can be configured to prompt for an authentication password if a command requiring authentication is entered prior to the user being authenticated or can generate an error message and not execute the command.

The authentication level parameters can be used to set which authentication level under which the modem 225. The modem 225 can be configured to support multiple authentication levels. Each authentication level can be associated with one or more command types and an indication indicating whether authentication is required prior to executing the respective command type. The following example illustrates a set of authentication levels that can be implemented by the modem 225. The authentication levels can be represented by the following numeric values: 0=authentication required for all types of modem command; 1=read and test command types are allowed without authentication but call-related command types, command types related to setting modem control parameters or executing a modem control command require authentication; 2=allow read, test, and call-related command types without authentication but command types related to setting modem configuration parameters or executing a modem control command that is not a read, test, or call-related command types require authentication.

FIG. 7A illustrates an example of a terminal interface interacting with the modem 225 via an terminal interface application to demonstrate the example authentication levels discussed above. In the example illustrated in FIG. 7A, the user has entered the QCAUTH command to disable authentication (the authentication control parameter is set to '0'). In response to receiving the parameter, the authentication module 362 of the modem 225 is configured to prompt the user for authentication credentials, which in this example is an authentication password. In this example, the user enters the correct authentication password in response to the prompt and the authentication module 362 of the modem 225 responds with an "OK" indicating that authentication has been disabled. FIG. 7B illustrates an example where the authentication password provided in response to the prompt from the authentication module 362 was incorrect, and the authentication module 362 responds with a message indicating that authentication has failed. In the example illustrated in FIG. 7B, the authentication module 362 does not disable authentication since an incorrect authentication password was provided.

FIGS. 8A, 8B, 8C, and 8D illustrate an example in which a user attempts to change the authentication level. In these examples, the authentication control parameter is set to "1" indicating that authentication is to be switched on if not already on using the authentication level specified in the authentication level parameter. If authentication is already enabled, the authentication module 362 is configured to operate using the authentication level specified in the authentication level parameter (if not already operating at that authentication level). The authentication module 362 is configured to prompt the user for authentication credentials, which in these examples is an authentication password. In the examples illustrated in FIGS. 8A, 8B, and 8C, the user provides the correct authentication parameter in response to the prompt and the authentication module 362 of the modem 225 responds with an "OK" indicating that authentication level has been changed to the requested level. FIG. 8D illustrates an example where the authentication password provided in response to the prompt from the authentication module 362 was incorrect, and the authentication module 362 responds with a message indicating that authentication has failed. In the example illustrated in FIG. 8D, the authentication module 362 does not change the current authentication level since an incorrect authentication password was provided.

FIG. 9A illustrates an example in which the user has entered the QCAUTH command to change the authentication password. In response to receiving the parameter, the authentication module 362 of the modem 225 is configured to prompt the user for authentication credentials, which in this example is an authentication password. In this example, the user enters the correct authentication password in response to the prompt as the first parameter and the new password as the second parameter. The authentication module 362 of the modem 225 responds with an "OK" indicating that the authentication password has been updated. FIG. 9B illustrates an example where the authentication password provided in response to the prompt from the authentication module 362 was incorrect, and the authentication module 362 responds with a message indicating that authentication has failed. In the example illustrated in FIG. 9B, the authentication module 362 does not change the authentication password.

FIG. 10A illustrates an example in which the user has entered the correct authentication password and the authentication level was previously set to the highest authentication level (which in this example is authentication level=0). Accordingly, the user must be authenticated for all modem control commands that are entered. In the example illustrated in FIG. 10A, the user enters the "COPS?" command which causes the modem to display a list of available networks to which the modem 225 of the mobile device 120 may be able to connect. The command is a ready-only type command in this instance, but authentication was required before the modem 225 will execute the command because the authentication module is currently configured to operate the modem at the highest authentication level where all commands require authentication. The COPS command can also be used to connect to a particular network, and thus can be either a read-only or test command and a command that sets configuration parameters of the modem 225. The authentication module 362 can be configured to identify when a command is issued with parameters that cause the command to provide read-only information versus parameters that would cause the modem to set one or more configuration parameters and to treat those commands differently if the modem 225 is operating under an authentication level that allows read-only commands to be executed without authentication (e.g. authentication levels 1 and 2 in this example).

FIG. 10B illustrates an example in which the user has not yet been authenticated and the authentication level was previously set to the second highest authentication level (which in this example is authentication level=1). Under this authentication level, read and test command types are allowed without authentication but call-related command types, command types related to setting modem control parameters or executing a modem control command require authentication. The read-only "COPS?" command can executed without first authenticating the user, and the modem 225 responds with an "OK" indicating that the command was successful and the network information is displayed. The "ATD" command which attempts to dial a number is then entered, but is unsuccessful, because the user has not been authenticated and call-related command types are not allowed this authentication level without first authenticating the user. The user then enters the QCAUTH command with parameter '3' which indicates that the user would like to provide an authentication password or other credentials. The authentication module 362 prompts the user for the password with the prompt "$QCAUTH>" in response to the QCAUTH command entered by the user. The user then enters the authentication password successfully, and is then able to successfully execute the ATD and +CSIM commands, the former of which place a call and the latter sends a command to the SIM card of the modem 225. FIG. 10D illustrates an example of the same set of commands being entered as in the example illustrated in FIG. 10B, but the user has not been authenticated and the authentication module 362 indicates that the commands cannot be executed because authentication failed.

FIG. 10C illustrates an example in which the user has not yet been authenticated and the authentication level was previously set to the lowest authentication level (which in this example is authentication level=2). Under this authentication level, read, test, and call-related command types are allowed without authentication but command types related to setting modem configuration parameters or executing a modem control command that is not a read, test, or call-related command types require authentication. As in the previous example, the read-only "COPS?" command can executed without first authenticating the user, and the modem 225 responds with an "OK" indicating that the command was successful and the network information is displayed. The "ATD" command which attempts to dial a number is then entered is successful in this example even though the user has not been authenticated, because the this authentication level does not require authentication for call-related modem control commands. FIG. 10E illustrates an example of the same set of commands being entered as in the example illustrated in FIG. 10C, but the user has not been authenticated and the authentication module 362 indicates that the commands cannot be executed because authentication failed.

The authentication level parameters discussed in this example are one possible implementation of a set of authentication levels. Other implementations that include additional and/or other authentication levels can be implemented. Furthermore, the numeric value representations of authentication level parameters utilized this example are merely provided to illustrate the concepts discussed herein and are not intended to limit the authentication control parameters to these numeric values. The authentication level parameters can be represented by other numeric and/or alphanumeric values that can be entered as part of a command issued to the modem 225.

The modem can be configured such that a user is required to enter the authentication password or credentials to change the level of authentication used by the modem, disable authentication, and to change the authentication password or credentials. The modem 225 can be configured with an initial password when issued by the service provider, and the initial password can be reset by the customer service staff in response to a request from the user (and the user presenting adequate identification to the customer service staff). The customer service staff of the network service provider can remotely access and update the password over a wireless connection. If the authentication fails in response to an incorrect password being entered, the user is unable to change the level of authentication, disable authentication, or change the authentication password. The user will also be unable to send any AT commands to the modem that require authentication if the authentication fails. If the authentication level is set to 0 (the highest level in this example), then the user will not be able to execute any AT commands in response to the authentication failing. If the authentication level is set to lower authentication level (e.g., 2 or 3 in this example), the user would only be able to submit AT commands that do not require authentication at authentication level at which the modem is currently configured in response to the authentication failing. If authentication is successful, the user can submit any AT command to the modem. This approach can, for example, prevent software on a computer system to which the mobile phone is tethered from executing unauthorized AT commands that can make calls, change critical modem settings, and/or disable the SIM card.

Example Implementations

FIG. 4 is a flow diagram of a process for protecting the configuration of a modem according to the techniques discussed herein. The process illustrated in FIG. 4 can be implemented using the modem 225 of mobile device 120 illustrated in FIGS. 1-3. The authentication module 362 of the modem 225 can provide means for performing the various stages included in the process illustrated in FIG. 4 unless otherwise specified.

A modem control command can be received at a terminal interface of the modem (stage 405). As discussed above, the modem 225 can be configured to receive an AT command or other type of modem control command. The command can be entered via a terminal interface application on the mobile device 120 or the command can be entered via a terminal interface on a device tethered to the mobile device 120, such as the computing device 180. The modem control command can be a modem control command may be a read-only command that requests information from the modem 225. The modem control command may also be a command configured to initiate a call by the modem 225 and/or to alter the configuration of the modem 225. As discussed above, modem control commands that are configured to cause the modem to place a call could allow an unauthorized person to utilize the data plan associated with the modem 225 without the permission of the owner of the mobile device 120. Furthermore, the commands configured to set modem configuration parameters could render the modem 225 inoperable or lock the authorized user of the modem 225 out requiring the user to contact their network service provider to unlock the SIM card and/or to obtain a replacement SIM card.

The modem control command can be authenticated (stage 410). The current authentication level associated with the modem 225 can be accessed. The authentication level information can be stored in a non-volatile, computer readable memory, such as the memory 360 of the modem 225. The authentication level information can indicate which authentication level should be applied when a modem control command is issued to the modem. The authentication level can be associated with one or more modem control commands and/or command types and an indication associated with each of the control commands and/or command types can be used to indicate whether the respective modem control command or command type requires or does not require authentication when the modem 225 is operating under that authentication level. If the authentication level indicates that the modem control command does not require authentication prior to execution, the authentication can be indicated to be successful.

The authentication level information can be stored by the modem 225 as a lookup table, a database, or other data structure from in the memory 360 of the modem or another similar storage of the modem. The authentication module 362 of the modem 225 can be configured to access the authentication level information in response to the modem receiving a modem control command. The authentication module 362 can be configured to determine whether the modem is currently configured to operate using a particular authentication level. For example, a user of the mobile device 120 having administrative rights to change the configuration of the modem 225 may have selected an administrative level under which the modem 225 should operate. The modem 225 may be configured to operate using a default authentication level if a user having administrator privileges has not otherwise selected an authentication level under which the modem 225 should operate. A manufacturer of the mobile device 120, the modem 225, or a network service provider may also configure the modem 225 of the mobile device 120 with a default authentication level. The manufacturer of the mobile device 120, the modem 225, or the network service provider may also configure the modem 225 authentication level information for a plurality of authentication levels.

The authentication module 362 can be configured to determine a modem control command type for a modem control command that has been received by the modem 225 if the modem control command is not expressly associated with the authentication level, the authentication module 362 can be configured to classify the modem control command as one of a plurality of command types. The authentication module 362 can be configured to maintain modem control command information in the memory 360 of the mobile device and can be configured to look up a modem command to determine a command type associated with the modem control command. The authentication module 362 can be configured to classify the modem control command as a command type that always requires authentication prior to execution responsive to the authentication module 362 being unable to find a match for a particular modem control command stored in the memory 360.

The authentication module 362 can be configured to contact a remote server, such as a trusted entity that is part of a network provided by a network service provider associated with the mobile device 120, for a control command type associated with the modem control command responsive to the authentication module 362 being unable to find a match for the modem control command stored in the memory 360. The authentication module 362 can be configured to classify the modem control command as a command type that always requires authentication prior to execution responsive to the trusted entity not having classification information associated with the modem control command.

In some implementations, a modem control command and/or a modem control command type can be associated with an authentication level if authentication is required to execute such a command or command of that command type, and modem control commands and/or command types not associated with the authentication level can be executed without requiring authentication. In other implementations, if a modem control command or a modem control command type is associated with an authentication level, the modem control command or commands of the modem control command type can be executed without authentication and all other modem control commands and/or command types will require authentication.

The authentication module 362 can be configured to proceed to stage 415 if no authentication is required for the modem control command or the type of modem control command that was received by the modem 225. The authentication module 362 can also be configured to indicate that authentication was successful for the modem control command responsive to authentication currently being turned off for the modem 225.

Once the authentication module 362 has determined that authentication is required for the modem control command and/or for the command type with which the modem control command is associated, the authentication module 362 can be configured to authenticate whether the user attempting to execute the modem control command is authorized to execute the command. The authentication module 362 can be configured to prompt the user for an authentication password or other authentication credentials to verify that the user is authorized to execute the modem control command. The authentication module 362 can be configured to issue a command that causes a prompt to be displayed in a terminal program or other interface on the mobile device 120 or the tethered computing device 180 if the computing device 180 is tethered to the mobile device 120. In some configurations, the modem 225 can be configured to receive other types of credentials such as biometric information for the user that the authentication module 362 can compare to information stored in the memory 360 of the modem 225 in order to determine whether the user is authorized to perform actions that require authentication. The biometric information can be captured using a sensor or sensors on the mobile device 120 and/or the tethered computing device 180.

The authentication module 362 of the modem 225 can be configured to perform different authentication and/or require different levels authentication levels for a user of the mobile device 120 and for user of a tethered device. For example, a first authentication level may be associated with the modem 225 for modem control commands issued from the mobile device 120 and a second authentication level may be associated with a tethered device, such as the computing device 180. Device specific authentication levels can also be defined by a user of the mobile device. More details of such implementation are discussed below with respect to the process illustrated in FIG. 5.

The modem control command can be executed responsive to the authentication being successful (stage 415). The modem 225 can be configured to execute the modem control command responsive to the authentication being successful. The authentication module 362 can be configured to execute the modem control command using a processor of the modem 225, such as the processor 310 illustrated in FIG. 3. The authentication module 362 can also be configured to display on a terminal program through which the user is communicating with the modem 225 a message indicating that the authentication was successful either before or after executing the modem control command. The authentication module 362 can also be configured to add an entry in a log in the memory 260 of the mobile device or in the memory 360 of the modem that authentication was successful. The log entry can include a timestamp of the time at which the authentication was performed, whether the authentication occurred from a tethered computing device 180 or from the mobile device 120, an identifier of the mobile device 120 if the modem control command was issued from the tethered device 180, and information identifying the modem control command that was requested to be executed.

The execution of the modem control command can be prevented responsive to the authentication being unsuccessful (stage 420). The modem 225 can be configured to prevent the execution the modem control command responsive to the authentication being successful. The authentication module 362 can be configured to display on a terminal program through which the user is communicating with the modem 225 a message indicating that the authentication was unsuccessful and that the modem control command will not be executed. The authentication module 362 can also be configured to terminate a connection with a tethered device, such as the computing device 180 if authentication is unsuccessful. For example, if incorrect an incorrect authentication password or other authentication credentials is provided by the user requesting the modem control command be executed, the authentication module 362 can be configured to terminate a connection with the tethered device 180. The authentication module 262 can also be configured to terminate the connection with the tethered device 180 if an incorrect authentication password or other authentication credentials are provided more than a predetermined number of times.

The authentication module 362 can also be configured to add an entry in a log in the memory 260 of the mobile device or in the memory 360 of the modem that authentication was unsuccessful. The log entry can include a timestamp of the time at which the authentication was performed, whether the authentication occurred from a tethered computing device 180 or from the mobile device 120, an identifier of the mobile device 120 if the modem control command was issued from the tethered device 180, and information identifying the modem control command that was requested to be executed.

FIG. 5 is a flow diagram of a process for authenticating a modem control command according to the techniques discussed herein. The process illustrated in FIG. 5 can be used to implement stage 410 of the process illustrated in FIG. 4. The process illustrated in FIG. 5 can be implemented using the modem 225 of mobile device 120 illustrated in FIGS. 1-3. The authentication module 362 of the modem 225 can provide means for performing the various stages included in the process illustrated in FIG. 5 unless otherwise specified.

An authentication level currently associated with the modem can be determined (stage 505). As discussed above, the authentication module 362 of the mobile device 120 can be configured to determine a current authentication level under which the modem 225 is configured to operate. The modem 225 can be configured to operate under a default authentication level if an authorized user of the mobile device 120 has not changed the authentication level under which the modem 225 is configured to operate. The current level under which the modem 225 is configured to operate can be stored in the authentication information stored in the memory 360 of the modem 225. The authentication module 362 can be configured to request that the data access module 366 retrieve the authentication level information from the memory 360.

The authentication module 362 can be configured to determine whether the mobile device 120 is tethered to an external computing device, such as the computing device 180, and whether the external computing device 180. The modem 225 can be configured such that the authentication level associated with the modem 225 may be different for request to execute a modem control command from a tethered device, such as the computing device 180, and modem control commands received from the mobile device 120. For example, the modem 225 can be configured to apply a first authentication level for modem control commands received from the tethered computing device 180 and a second authentication level for modem control commands received from the mobile device 120. The first authentication level may be more restrictive than the second authentication level by requiring authentication for more types of modem control commands received from the tethered computing device 180 than from the mobile device 120. This configuration can allow an authorized user of the mobile device 120 to share the network connectivity of the mobile device 120 with a user of the tethered computing device 180 while restricting the types of activities that the tethered device 180 may perform. For example, the tethered computing device 180 may be required to provide an authentication password or other credentials prior to the modem 225 executing a command that initiates a call while such a command issued from the mobile device 120 do not require authentication before executing the modem control command. Other such differences between the specific modem control commands and/or command types that may be executed with our without authentication may associated with the authentication control levels associated with the computing device 180 and the mobile device 120. The authentication module 362 of the modem 225 can also be configured to associate different authentication levels with different tethered computing devices 180. For example, a first authentication level may be associated with a tablet device that may be tethered to the mobile device 120 while a second authentication level may be associated with a laptop computer that may be tethered to the mobile device 120. Such a configuration can provide an authorized user of the mobile device with a flexible solution for providing various devices with different authentication levels based on the level of access that the authorized user would like the device to have to the modem 225 configuration and usage. The authentication module of the modem 225 can be configured to provide a user interface that enables an authorized user of the mobile device 120 to add device-specific authorization level information for devices that may be tethered to the mobile device 120.

A command type associated with the modem control command can be determined (stage 510). Stage 510 is optional and may not need to be performed. For example, if the modem control command is associated with the authentication level and the authentication is associated with an indication whether the modem control command requires authentication, then authentication module 362 can be configured to skip stage 510, because the authentication module 362 already has information whether authentication need to be performed for the modem control command. Otherwise, if the modem control command is not already associated with the authentication level under which the modem 225 is currently configured to operate, the authentication module 362 can be configured to determine a command type associated with the modem control command to determine whether the command type is associated with a authentication level under which the modem 225 is configured to operate and to determine whether the command type is associated with an indication that indicates whether authentication needs to be performed prior to executing modem commands of that command type.

The authentication module 362 can be configured to maintain modem control command information in the memory 360 of the mobile device and can be configured to look up a modem command to determine a command type associated with the modem control command. The authentication module 362 can be configured to classify the modem control command as a command type that always requires authentication prior to execution responsive to the authentication module 362 being unable to find a match for a particular modem control command stored in the memory 360.

The authentication module 362 can be configured to contact a remote server, such as a trusted entity that is part of a network provided by a network service provider associated with the mobile device 120, for a control command type associated with the modem control command responsive to the authentication module 362 being unable to find a match for the modem control command stored in the memory 360. The authentication module 362 can be configured to classify the modem control command as a command type that always requires authentication prior to execution responsive to the trusted entity not having classification information associated with the modem control command.

In some implementations, a modem control command and/or a modem control command type can be associated with an authentication level if authentication is required to execute such a command or command of that command type, and modem control commands and/or command types not associated with the authentication level can be executed without requiring authentication. In other implementations, if a modem control command or a modem control command type is associated with an authentication level, the modem control command or commands of the modem control command type can be executed without authentication and all other modem control commands and/or command types will require authentication.

An authentication procedure can be performed on the modem control command based on the authentication level associated with the modem and the command type associated with the modem control command (stage 515). The authentication module 362 can be configured to prompt for an authentication password or other credentials and to compare an authentication password or other credentials provided in response to the request with an authentication password or other credentials stored in the memory 360 of the modem 225. The stored copy of the authentication password or other credentials should be stored in a portion of the memory 360 that is substantially inaccessible from outside the modem, and the modem 225 can be configured such that authentication is required before the authentication password or other credentials may be updated. In some implementations, the other credentials may comprise biometric information that can include physiological traits of an authorized user and/or behavioral characteristics of the authorized user. For example, the physiological trait information can include fingerprint or palm print recognition, facial recognition, hand geometry recognition, retinal recognition, and/or other forms of physiological data that can be used to uniquely identify an authorized user. The behavioral characteristics information can include information regarding patterns of behavior of the authorized user, such as typing rhythm, voice characteristics, and/or other patterns of behavior that can be used to identify the authorized user. The biometric information can be captured by one or more sensors of the mobile device 120 and/or the tethered computing device 180 and be used by the authentication module 362 of the modem to authenticate a user. If the authentication password or other credentials match those stored in the memory 360 of the modem 225, the authentication module 362 can be configured to indicate that the authentication was successful, and the authentication module 362 can be configured to execute one or more modem control commands that require authentication. In some implementations, the authentication module 362 can be configured to require that the authentication credentials be presented any time that a change is made to the authentication level of the modem 225, when authentication is turned on or off, and/or when a modem control command requiring authentication according to the current authentication level under which the modem 225 is configured to operate. In some implementations, the authentication module can be configured to allow actions requiring authentication to be performed for a limited period of time after the user has been authenticated (also referred to herein as an authenticated session) in which actions requiring authentication are performed without requiring the user to present the authentication credentials before the modem 225 will perform the requested actions.

FIG. 6 is a flow diagram of a process for determining an authentication level currently associated with a modem according to the techniques discussed herein. The process illustrated in FIG. 6 can be used to implement stage 505 of the process illustrated in FIG. 5. The process illustrated in FIG. 6 can be implemented using the modem 225 of mobile device 120 illustrated in FIGS. 1-3. The authentication module 362 of the modem 225 can provide means for performing the various stages included in the process illustrated in FIG. 6 unless otherwise specified.

The authentication level currently associated with the modem can be determined from a plurality of authentication levels (stage 605). The authentication module 362 can be configured to access authentication information stored in the memory 360 of the modem that includes a listing of all of the authentication levels supported by the modem 225. The authentication information stored in the memory 360 can include an indication that identifies which of the plurality of supported authentication levels is currently associated with the modem 225. In some implementations, the modem 225 may be configured to operate using a first authentication level for processing modem control commands issued from the mobile device 120 and a second authentication level for processing modem control commands issued from a tethered device, such as the computing device 180. The authentication module 362 can be configured to determine whether mobile device 120 is tethered to an external device and whether the modem control command was issued from the mobile device 120 or the tethered computing device 180, and to select the appropriate authentication level to use based on the source of the modem control command if different authentication levels are used for command issued from the mobile device 120 and a tethered computing device 180. The authentication module 362 can also be configured to select an appropriate device-specific authentication level if there are device-specific authentication levels defined for specific tethered computing devices 180. As discussed above, the authentication module 362 can be configured to allow a user of the mobile device 120 to define device-specific authentication levels that can be applied specific devices that may be tethered to mobile device 120.

Modem control commands and/or command types associated with the authentication level can be determined (stage 610), and information indicating whether each respective command type requires authentication prior to executing the respective command type can be accessed (stage 615). Each authentication level can be associated one or more modem control commands and/or modem control command types, and each modem control command and/or modem control command type can be associated with an indication indicating whether authentication is required to perform that respective modem control command and/or modem control command type. The authentication level information can also include default modem control command and/or modem control command type, and the default modem control command and/or modem control command type can each be associated with an indication whether authentication is required by default for the authentication level. The default modem control command and/or default modem control command type can be utilized to set whether authentication is required if a particular command or command type is received by the modem 225 and the authentication module 362 cannot find a match for the modem control command or the modem control command type in the authentication level information for the authentication level or levels under which the modem 225 is currently configured to operate.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for protecting a configuration of a modem, the method comprising:
    receiving a modem control command at a terminal interface of the modem;
    authenticating the modem control command by
        determining an authentication level associated with the modem, wherein the associated authentication level is selected from a plurality of authentication levels, and wherein determining the authentication level associated with the modem comprises determining whether the modem is tethered to an external computing device and applying a device-specific authentication level responsive to the modem being tethered to the external computing device,
        determining a command type associated with the modem control command, and
        executing an authentication procedure based on the authentication level associated with the modem and the command type associated with the modem control command, wherein the authentication procedure is different for different authentication levels of the plurality of authentication levels;
    executing the modem control command responsive to authentication being successful; and
    preventing execution of the modem control command responsive to the authentication being unsuccessful.

2. The method of claim 1, wherein the modem control command comprises an AT command or other modem control command for interfacing with the modem.

3. The method of claim 1, wherein determining the authentication level associated with the modem comprises determining the authentication level associated with the modem from a plurality of authentication levels, wherein each respective authentication level of the plurality of authentication levels is associated with one or more command types and an indication indicating whether the authentication is required prior to executing each respective command type.

4. The method of claim 3, wherein executing the authentication procedure based on the authentication level associated with the modem and the command type associated with the modem control command further comprises determining whether the indication associated with the command type associated with the modem control command requires performing the authentication prior to executing the modem control command.

5. The method of claim 1, wherein the authentication level associated with the modem is selected from a mandatory authentication level, a read-only authentication level, and calls-plus-read-only authentication level.

6. The method of claim 5, further comprising requiring authentication credentials to be provided before executing all modem control commands responsive to the authentication level being set to the mandatory authentication level.

7. The method of claim 5, further comprising requiring authentication credentials to be provided before executing all modem control commands except those modem control commands that are a read-only or test type modem control command responsive to the authentication level being set to the read-only authentication level.

8. The method of claim 5, further comprising requiring authentication credentials to be provided before executing all modem control commands, except those that are a read-only or test type modem control command or a modem control command to place a call using the modem, responsive to the authentication level being set to the calls-plus-read-only authentication level.

9. The method of claim 1, wherein executing the authentication procedure based on the authentication level associated with the modem and the command type associated with the modem control command comprises:
    requesting an authentication password be provided; and
    comparing the authentication password to a previously received authentication password stored in a protected, non-transitory memory of the modem.

10. The method of claim 1, wherein the device-specific authentication level is more restrictive than a non-device specific authentication level, wherein the device-specific authentication level requires user authentication for more types of modem commands than required by the non-device specific level.

11. The method of claim 1, wherein executing the authentication procedure based on the authentication level associated with the modem and the command type associated with the modem control command comprises preventing the modem control command from being executed in response to the command type being a command type that modifies the modem configuration and responsive to the authentication level being the device-specific authentication level indicating that the external computing device is tethered to the modem.

12. A computing device comprising:
a modem configured to:
receive a modem control command at a terminal interface of the modem;
authenticate the modem control command, the modem being configured to
determine an authentication level associated with the modem, wherein the associated authentication level is selected from a plurality of authentication levels, and wherein the modem is further configured to determine whether the modem is tethered to an external computing device and to apply a device-specific authentication level responsive to the modem being tethered to the external computing device,
determine a command type associated with the modem control command, and
execute an authentication procedure based on the authentication level associated with the modem and the command type associated with the modem control command, wherein the authentication procedure is different for different authentication levels of the plurality of authentication levels;
execute the modem control command responsive to authentication being successful; and
prevent execution of the modem control command responsive to the authentication being unsuccessful.

13. The computing device of claim 12, wherein the modem being configured to determine the authentication level associated with the modem is configured to determine the authentication level associated with the modem from a plurality of authentication levels, wherein each respective authentication level of the plurality of authentication levels is associated with one or more command types and an indication indicating whether the authentication is required prior to executing each respective command type.

14. The computing device of claim 13, wherein the modem being configured to execute the authentication procedure based on the authentication level associated with the modem and the command type associated with the modem control command is further configured to determine whether the indication associated with the command type associated with the modem control command requires the authentication be performed prior to executing the modem control command.

15. The computing device of claim 12, wherein the authentication level associated with the modem is selected from a mandatory authentication level, a read-only authentication level, and calls-plus-read-only authentication level.

16. The computing device of claim 15, wherein the modem is configured to require authentication credentials to be provided before executing all modem control commands responsive to the authentication level being set to the mandatory authentication level.

17. The computing device of claim 15, wherein the modem is configured to require authentication credentials to be provided before executing all modem control commands except those modem control commands that are a read-only or test type modem control command responsive to the authentication level being set to the read-only authentication level.

18. The computing device of claim 15, wherein the modem is configured to require authentication credentials to be provided before executing all modem control commands, except those that are a read-only or test type modem control command or a modem control command to place a call using the modem, responsive to the authentication level being set to the calls-plus-read-only authentication level.

19. A non-transitory, computer-readable medium, having stored thereon computer-readable instructions for protecting a configuration of a modem of a mobile device, comprising instructions configured to cause a computer to:
receive a modem control command at a terminal interface of the modem;
authenticate the modem control command, the instructions configured to cause the computer to authenticate the modem control command comprise instructions configured to cause the computer to
determine an authentication level associated with the modem, wherein the associated authentication level is selected from a plurality of authentication levels, and wherein the instructions configured to cause the computer to determine the authentication level further comprise instructions configured to cause the computer to determine whether the modem is tethered to an external computing device and to apply a device-specific authentication level responsive to the modem being tethered to the external computing device,
determine a command type associated with the modem control command, and
execute an authentication procedure based on the authentication level associated with the modem and the command type associated with the modem control command, wherein the authentication procedure is different for different authentication levels of the plurality of authentication levels;
execute the modem control command responsive to authentication being successful; and
prevent execution of the modem control command responsive to the authentication being unsuccessful.

20. The computer-readable medium of claim 19, wherein the instructions configured to cause the computer to determine the authentication level associated with the modem further comprise instructions configured to cause the computer to determine the authentication level associated with the modem from a plurality of authentication levels, wherein each respective authentication level of the plurality of authentication levels is associated with one or more command types and an indication indicating whether the authentication is required prior to executing each respective command type.

21. The computer-readable medium of claim 20, wherein the instructions configured to cause the computer to execute the authentication procedure based on the authentication level associated with the modem and the command type associated with the modem control command further comprise instructions configured to cause the computer to determine whether the indication associated with the command type associated with the modem control command requires the authentication be performed prior to executing the modem control command.

22. The computer-readable medium of claim 19, wherein the authentication level associated with the modem is selected from a mandatory authentication level, a read-only authentication level, and calls-plus-read-only authentication level.

23. The computer-readable medium of claim 22, wherein the instructions configured to cause the computer to authenticate the modem control command comprise instructions configured to cause the computer to require authentication credentials to be provided before executing all modem control commands responsive to the authentication level being set to the mandatory authentication level.

24. The computer-readable medium of claim 22, wherein the instructions configured to cause the computer to authenticate the modem control command comprise instructions configured to cause the computer to require authentication credentials to be provided before executing all modem control commands except those modem control commands that are a read-only or test type modem control command responsive to the authentication level being set to the read-only authentication level.

25. The computer-readable medium of claim 22, wherein the instructions configured to cause the computer to authenticate the modem control command comprise instructions configured to cause the computer to require authentication credentials to be provided before executing all modem control commands, except those that are a read-only or test type modem control command or a modem control command to place a call using the modem, responsive to the authentication level being set to the calls-plus-read-only authentication level.

26. An apparatus comprising:
means for receiving a modem control command at a terminal interface of a modem of the apparatus;
means for authenticating the modem control command comprising
means for determining an authentication level associated with the modem, wherein the associated authentication level is selected from a plurality of authentication levels, and wherein the means for determining the authentication level further comprises means for determining whether the modem is tethered to an external computing device and means for applying a device-specific authentication level responsive to the modem being tethered to the external computing device,
means for determining a command type associated with the modem control command, and
means for executing an authentication procedure based on the authentication level associated with the modem and the command type associated with the modem control command, wherein the authentication procedure is different for different authentication levels of the plurality of authentication levels;
means for executing the modem control command responsive to authentication being successful; and
means for preventing execution of the modem control command responsive to the authentication being unsuccessful.

27. The apparatus of claim 26, wherein the means for determining the authentication level associated with the modem comprising means for determining the authentication level associated with the modem from a plurality of authentication levels, wherein each respective authentication level of the plurality of authentication levels is associated with one or more command types and an indication indicating whether the authentication is required prior to executing each respective command type.

28. The apparatus of claim 27, wherein the means for executing the authentication procedure based on the authentication level associated with the modem and the command type associated with the modem control command further comprising means for determining whether the indication associated with the command type associated with the modem control command requires the authentication be performed prior to executing the modem control command.

29. The apparatus of claim 26, wherein the authentication level associated with the modem is selected from a mandatory authentication level, a read-only authentication level, and calls-plus-read-only authentication level.

30. The apparatus of claim 29, wherein the means for authenticating comprises means for requiring authentication credentials to be provided before executing all modem control commands responsive to the authentication level being set to the mandatory authentication level.

31. The apparatus of claim 29, wherein the means for authenticating comprises means for requiring authentication credentials to be provided before executing all modem control commands except those modem control commands that are a read-only or test type modem control command responsive to the authentication level being set to the read-only authentication level.

32. The apparatus of claim 29, wherein the means for authenticating comprises means for requiring authentication credentials to be provided before executing all modem control commands, except those that are a read-only or test type modem control command or a modem control command to place a call using the modem, responsive to the authentication level being set to the calls-plus-read-only authentication level.

* * * * *